J. KAUFMAN.
TROLLEY FOR CARS.
APPLICATION FILED JUNE 5, 1908.
904,877.
Patented Nov. 24, 1908.
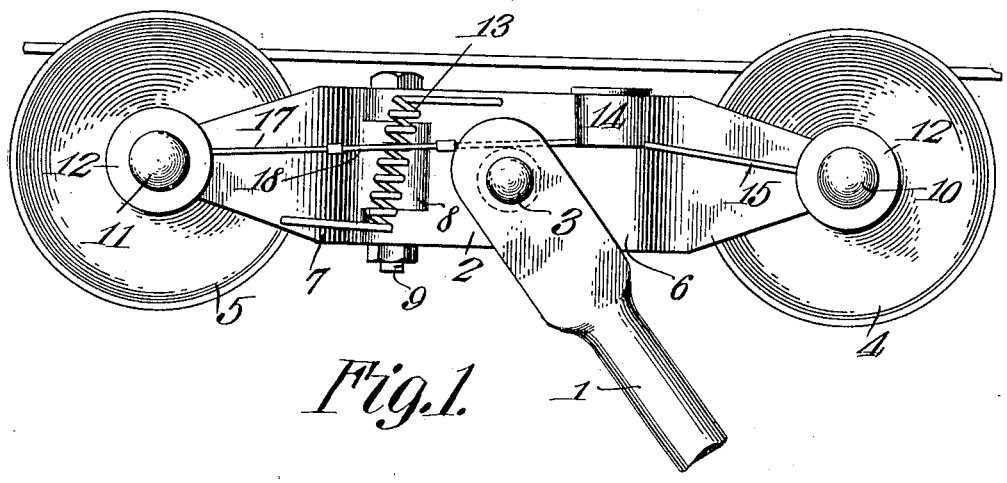
Fig.1.
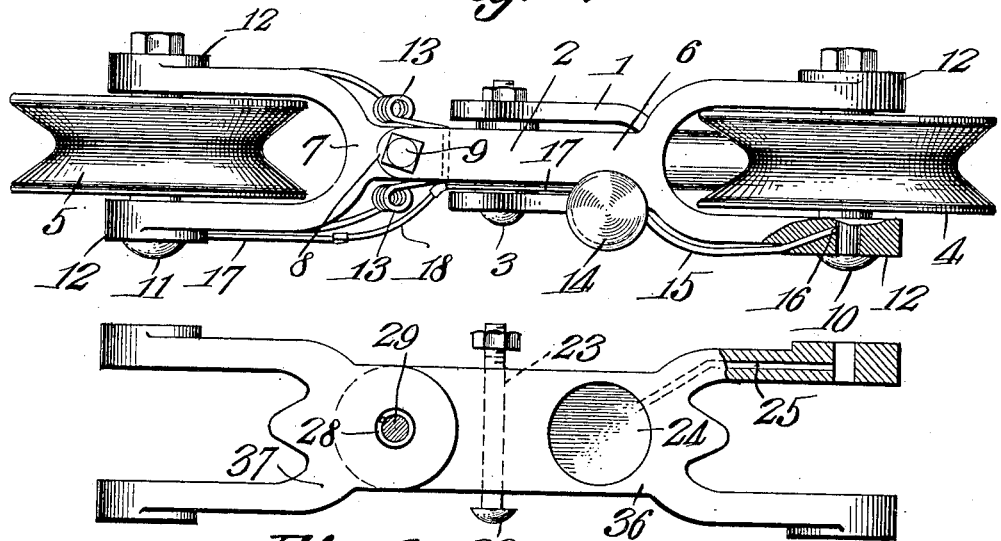
Fig.2.
Fig.3.
Witnesses
Inventor
John Kaufman,
By C.A. Snow & Co.
Attorneys

UNITED STATES PATENT OFFICE.

JOHN KAUFMAN, OF HAZLETON, PENNSYLVANIA, ASSIGNOR OF ONE-THIRD TO H. H. SHELLENBERGER, OF EASTON, PENNSYLVANIA.

TROLLEY FOR CARS.

No. 904,877.     Specification of Letters Patent.     Patented Nov. 24, 1908.

Application filed June 5, 1908. Serial No. 436,952.

*To all whom it may concern:*

Be it known that I, JOHN KAUFMAN, a citizen of the United States, residing at Hazleton, in the county of Luzerne and State of Pennsylvania, have invented a new and useful Trolley for Cars, of which the following is a specification.

This invention relates mainly to trolleys for use on electrically driven cars which obtain their power from overhead wires; and has for its object to provide a trolley which shall remain at all times in contact with the conducting wire and not jump nor be thrown off the wire at curves, switches, crossovers and other interrupted points. This object is attained by making the trolley head in two parts flexibly joined together by a vertical pivot, each part carrying a wheel of the usual form, the two parts held yieldingly in line with each other by suitable means which will permit them to easily follow all horizontal curves in the overhead conductor. The trolley is pivotally supported at its center on a horizontal axis by means of the usual pole fastened on the top of a car.

To more clearly understand the invention, attention is called to the following detailed description in connection with the accompanying drawing in which Figure 1 is a side elevation of the trolley pivotally mounted on the upper end of a trolley pole, and Fig. 2 a top plan view of the same with a portion broken away to more clearly illustrate a feature of the invention. Fig. 3 is a plan view of a modified form of the trolley head.

Like reference characters are used for the same parts in Fig. 1 and Fig. 2.

In the drawing, 1 represents a trolley pole of ordinary construction, forked at its upper end to straddle the trolley head 2 and pivotally connected with said head by a horizontal bolt or pin 3 midway between the forward and rear wheels 4 and 5 respectively.

The trolley head 2 is preferably made in two parts 6 and 7 connected in rear of the trolley pole pivot 3 by a hinge joint 8 through which joint a vertical pivot pin or bolt 9 passes. The extreme ends of the parts 6 and 7 are forked to receive the trolley wheels 4 and 5, respectively, which turn on horizontal pins or bolts 10 and 11 held against rotation in bosses 12 on the extremities of the forked ends of the trolley head 2.

On each side of the trolley head 2 is placed a spring 13 which may be flat, coiled, or of any convenient type, said springs being fastened to one part of the trolley head and bearing with equal pressure on the other part, the springs of course extending across the hinged connection between the two parts 6 and 7, and keep the wheels 4 and 5 in line when running straight, but where the conducting wire curves the spring 13 on the inside of the curve yields so that the wheels automatically adjust themselves laterally to the direction taken by the wire. As the trolley is held against the wire by springs at the base of the trolley pole in the usual manner it follows that because of the horizontal pivotal connection between the trolley and the pole, any cause which tends to force one of the wheels below the conductor wire will press the other wheel closer in contact therewith and prevent the trolley leaving the wire.

Fastened to or made integral with the forward part 6 of the trolley head is an oil cup 14 from the bottom of which a small tube 15 runs forwardly through a hole in one of the bosses 12 and discharges a lubricant into a groove 16 formed in one side of the bolt 10, and works its way along said groove to the wheel. Another tube 17 carries the lubricant to the rear wheel, but at the hinge joint 8 a flexible section 18 is inserted in the length of the tube to enable the rear wheel to swing laterally without breaking the tube.

A trolley constructed as above described, and held in contact with the conducting wire by sufficient spring force to keep the two wheels in engagement with said wire, will pass with ease over inequalities in the wire that would throw the present form of trolley out of contact. This result is obtained by making each wheel, in a measure, control the other. As heretofore mentioned, a downward tendency of one wheel causes an upward tendency of the other and thus each wheel acts as a corrective upon the other wheel.

The trolley head may be cast or forged and made of steel, brass or other metal and, being very simple, it can be made and assembled at comparatively slight expense and runs for a long time without getting out of order.

A modified form of the trolley head is illustrated in Fig. 3 and as there shown the trolley head 2 is made wider so that the oil cup 24 may be cast or bored therein from which channels 25 formed in the head lead to the several bearings for the trolley wheels. The trolley head is as in the previous form, made of two sections 36 and 37 connected by a vertical pivot bolt or pin 29 around which a spring is coiled and its ends suitably attached to the sections 36 and 37.

What is claimed is:—

1. A trolley comprising a two part head hinged together on a vertical axis, a contact wheel journaled on the outer end of each part, a reservoir for lubricating material on one of said parts, pipes leading from said reservoir to each contact wheel axle, and a flexible joint in one of said pipes.

2. A trolley head comprised of a pair of hinged sections, one of the sections being relatively fixed, an oil cup carried by the said section, and flexible oil conducting pipes leading from said cup to the bearing of the other section.

3. A trolley comprising a pole, a section pivoted upon the pole for rocking movement in a vertical plane, a trolley wheel carried at one end of the section, a second section hinged to the first mentioned section at the other end thereof and adapted to swing in a transverse direction, and springs secured at one end one to each side of the first mentioned section, said springs bearing at their other ends against the sides of the second mentioned section, and being coiled intermediate their ends, an oil cup carried by the first mentioned section, and oil conducting pipes leading from the cup, and a wheel bearing at the end of the second mentioned section to which the oil pipes are designed to supply oil from the cup.

In testimony that I claim the foregoing as my own, I have hereto affixed my signature in the presence of two witnesses.

JOHN KAUFMAN.

Witnesses:
   H. H. SHELLENBERGER,
   H. W. HEIDENREICH.